Aug. 7, 1928.

H. J. WEYDERT 1,679,698

SHOCK ABSORBER WORKING WITH PROGRESSIVE COMPRESSION

Filed Nov. 23, 1923

H. J. WEYDERT 1,679,698

SHOCK ABSORBER WORKING WITH PROGRESSIVE COMPRESSION

Filed Nov. 23, 1923     5 Sheets-Sheet 2

Hubert Jules Weydert Inventor
By
B. Singer. Atty.

Aug. 7, 1928. 1,679,698
H. J. WEYDERT
SHOCK ABSORBER WORKING WITH PROGRESSIVE COMPRESSION
Filed Nov. 23, 1923 5 Sheets-Sheet 3

Aug. 7, 1928.

H. J. WEYDERT 1,679,698

SHOCK ABSORBER WORKING WITH PROGRESSIVE COMPRESSION

Filed Nov. 23, 1923    5 Sheets-Sheet 5

Patented Aug. 7, 1928.

1,679,698

UNITED STATES PATENT OFFICE.

HUBERT JULES WEYDERT, OF LEVALLOIS-PERRET, FRANCE.

SHOCK ABSORBER WORKING WITH PROGRESSIVE COMPRESSION.

Application filed November 23, 1923, Serial No. 676,618, and in France December 2, 1922.

This invention relates to improvements in shock absorbers adapted for use in connection with aeroplanes to effect a safe landing of the same and also adapted for use on automobile vehicles and for other similar uses.

The object of the invention is to provide an improved apparatus of this kind embodying a plurality of superposed yieldable cushioning or shock absorbing elements and which act successively to absorb shocks, starting at zero and continuing progressively until the entire shock absorbing effect of the said elements, or so much thereof as may be necessary, is employed.

With the above and other objects in view, the invention consists in the construction, combination and arrangement of devices hereinafter described and claimed.

In the accompanying drawings, Figure 1 is a vertical sectional view of a preferred form of my invention embodying spring actuated shock absorbing elements pneumatically actuated shock absorbing elements and liquid shock absorbing elements.

Figure 1:
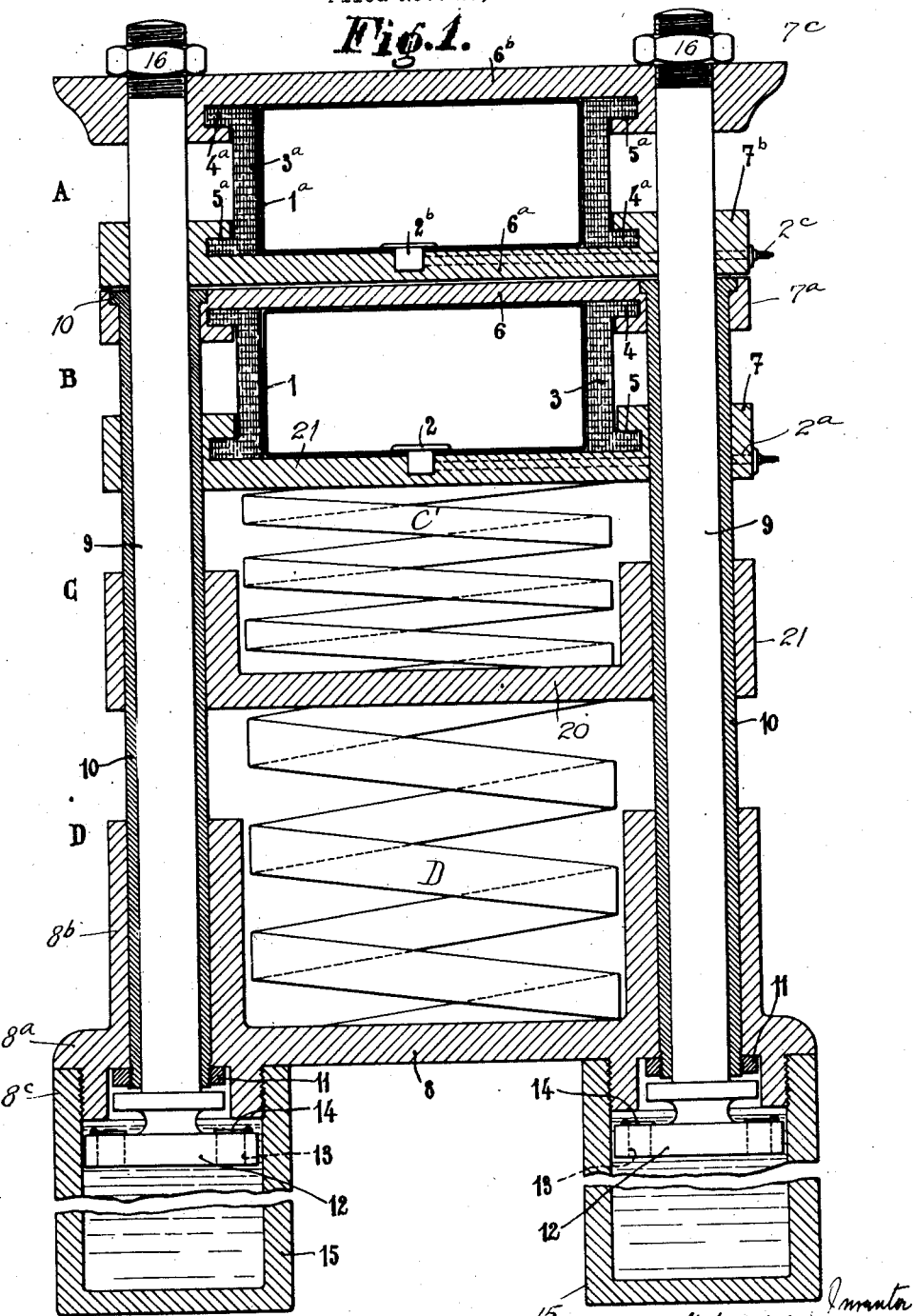

In the form of my invention shown in Figure 1, four superposed yieldable shock absorbing elements, A, B, C, D, are employed together with a base 8. Said base is provided with abutments $8^a$, each of which has an upwardly extending tubular portion $8^b$ and also has a depending circular flange $8^c$.

Cylinders 15 which form fluid containing chambers have their upper ends screwed on the flanges $8^c$ and in practice these cylinders are nearly filled with suitable fluid, such as oil. Tubes 10 extend upwardly through the tubular portions $8^b$ of the base abutments, extend above the base for a suitable height and are provided at their lower ends with stop flanges 11 which are screwed thereon. At their upper ends said tubes 10 are provided with stop flanges $10^a$.

The lowest compression element D comprises a coil spring D' which bears on the base and a bearing plate 20 which bears on said spring and is provided with abutments 21 which abutments have vertical bores through which the tubes 10 extend, said bearing plate being vertically movable on said tubes.

The yieldable element C comprises a spring C' which bears on the bearing plate 20 and a bearing plate 21 which bears on said spring C' and has bored abutments 7 which are slidable on the tubes 10. The yieldable elements B, A operate pneumatically and are practically identical in construction. The element B comprises a bearing plate 6 which has bored abutments $7^a$ which are slidable on the tubes 10 and in which the upper stop flanges $10^a$ of said tubes engage, as shown. A flexible hollow structure 1 which is arranged to be inflated with compressed air or the like is arranged between the bearing plate 21 and the bearing plate 6 and a valve 2 is provided therefor which communicates with a duct $2^a$ which extends to one side of the bearing plate 21 and by means of which and said valve said hollow pneumatically actuated structure 1 may be inflated. A casing member 3 is arranged around the inflatable member 1 and between the bearing plates 21, 6, which respectively form the bottom and top of the member B. Said casing member has outwardly extending flanges 4 which engage in grooves 5 with which the abutments of said bearing plates are provided as shown. The said casing member is a fabric whose circumferential threads are of nonextensible material whose axially extending threads are of an elastic material so that said casing member permits variations in the axial extent of the inflatable member and prevents variations in the diametrical extent thereof, as will be understood. The nonextensible circumferential threads and the elastic axial threads may be of any suitable materials such as are well known in the arts.

The uppermost or prime acting yieldable element A comprises a bottom plate 6ª and a top plate 6ᵇ, a pneumatic, inflatable member 1ª which is identical in construction with the member 1 hereinbefore described and a casing member 3ª which is identical in construction with the casing member 3 hereinbefore described, the flanges of said casing member being indicated at 4ª and the grooves in which said flanges are received being indicated at 5ª. Said plates 6ª, 6ᵇ are provided respectively with abutments 7ᵇ, 7ᶜ and said abutments have bores through which vertical piston rods 9 extend, said piston rods being movable through the tubes 10 and being provided at their lower ends with pistons 12 which operate in the fluid containing members 10. Each piston has small bores 13 to permit the passage of fluid therethrough and is also provided with valves 14 which close downwardly on said bores and open upwardly therefrom so that the pistons are adapted to move slowly during down strokes, through the fluid in chambers 15. The piston rods 9 have stop nuts 16 at their upper ends, which bear on the uppermost bearing plate 6ᵇ. The bearing plate 6ª has a valve 2ᵇ and a duct 2ᶜ similar to those of the bearing plate 21 and to enable the member 1ª to be inflated with compressed air as will be understood.

Assuming that the device is mounted on an aeroplane or the like its operation is as follows:

The base 8 is connected to the landing train or framing, while the upper plate 6 is connected to the avion. The latter may be assumed to weigh 2400 kg. and if there are four absorbers mounted on the landing frame, then each one of them will support 600 kg. in case that the avion rests on the earth. The pneumatic elements have an interior section of 300 cm2. First of all the upper element A is brought into position of equilibrium. In order to arrive at this result, this element is inflated, whereby a lengthening of the same is produced in the sense of its length without sensible variations of the diameter. The lengthening is limited to the extent of the length of the element, with aid of the rods 9. The element is, after having been inflated to 2 kg., equilibrated, since it can now support a load of 600 kg. Thereupon the second element B is inflated to a double value, that is to say, to 4 kg. and its lengthening is limited, by means of the tubes 10 and the nuts 11, equally to the amount of its length. These two elements can not exceed, in the moment of compression, their original position, owing to the abutments 7.

The spiral spring C' of the element C is so constructed that its compressive action commences only if the load attains 2400 kg., whereas its compression is limited to 5000 kg. The spring D' of the fourth element is sufficiently strong to begin its working at this moment only. If four elements are not sufficient, any necessary number of elements may be employed for deadening of the maximum effort foreseen. The apparatus is then ready for use and presents itself in a manner analogous to Fig. 1.

It will be understood that with the avion reposing on the earth, the upper element is compressed, giving a braking effort progressing up to 1200 kg. At this moment, it bears on the four abutments 7 and the second element commences to work, at 1200 kg. up to 2400 kg. in order to repose thereupon on its abutments. The third element then enters into action, going up to 5000 kg. and if the effort is still not braked, the fourth element will commence to work.

It is to be understood that the apparatus could be provided with pneumatic elements only, with varying pressure and the number of these pneumatic elements could be varied and replaced by as many spring elements. In case that the shock absorbing effort needs not be extremely progressive, at the beginning, all elements could consist of spiral springs.

Should the pressure to be taken up by a pneumatic element be such as to render difficult, with regard to the diameter, a sufficient resistance, the envelope and the single chamber could be replaced by any chosen number of chambers and envelopes of smaller diameter placed side by side. All these chambers could then communicate by means of channels in order that the pressures in each of them could equilibrate themselves.

According to Fig. 1, the lengthening of each element is limited by abutments, but a limitation of the lengthening could be foreseen equally well by an adequate confection of the tissue, or shell. It is possible, for example, to intercalate non-elastic threads of suitable length in the chain of the tissue, between the elastic treads.

When the envelope is crushed, the warp threads, which are not elastic, are folded accordion like. If the envelope consists of an elastic knitting or the like, the knitting or the like itself will limit the extension of the envelope.

Figure 2:
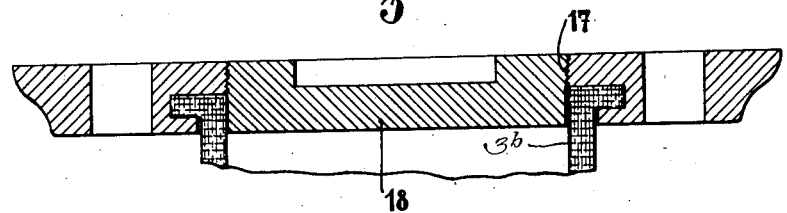
Figure 2 is a detail section showing a modification of construction of the pneumatic shock absorbing elements.

In Figure 2 I show a modification in the construction of the pneumatically operated yieldable elements in which each bearing plate is provided with an opening 17 corresponding in diameter with the interior diameter of the casing 3ᵇ and a suitable stopper element 18 is threaded in said opening and partly enters said envelope.

Figure 3:
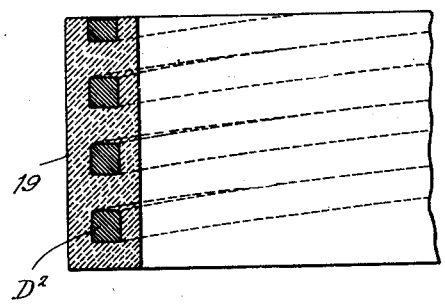
Figure 3 is a similar view showing a modification of construction of the spring actuated shock absorbing elements.

In Figure 3 I show a modified construction of the spring D² in which the same is embedded in a tubular rubber block 19.

Figure 4:
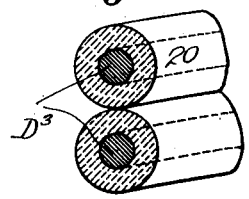
Figure 4 is a similar view showing another modification of the same.

In Figure 4 I show another modified construction of the spring D³, in which the coils of the same are embedded in rubber tubular coverings 20.

Figure 5:
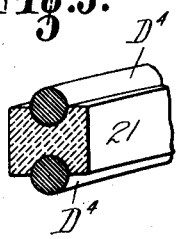
Figure 5 is a similar view showing another modification of the same.

In Figure 5 I show another modified construction of the spring D⁴ in which a rubber or other elastic fabric strip 21 is arranged between the spring coils.

Figure 6:
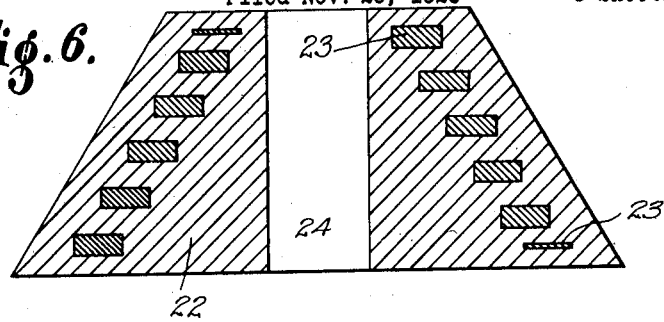
Figure 6 is a similar view showing another modification of the same.

In Figure 6 I show another modified construction of spring in which the same is truncated conical rubber block 22 in which, at appropriate distances apart iron or steel rings 23 are embedded, the block having a central bore 24.

Figure 7:
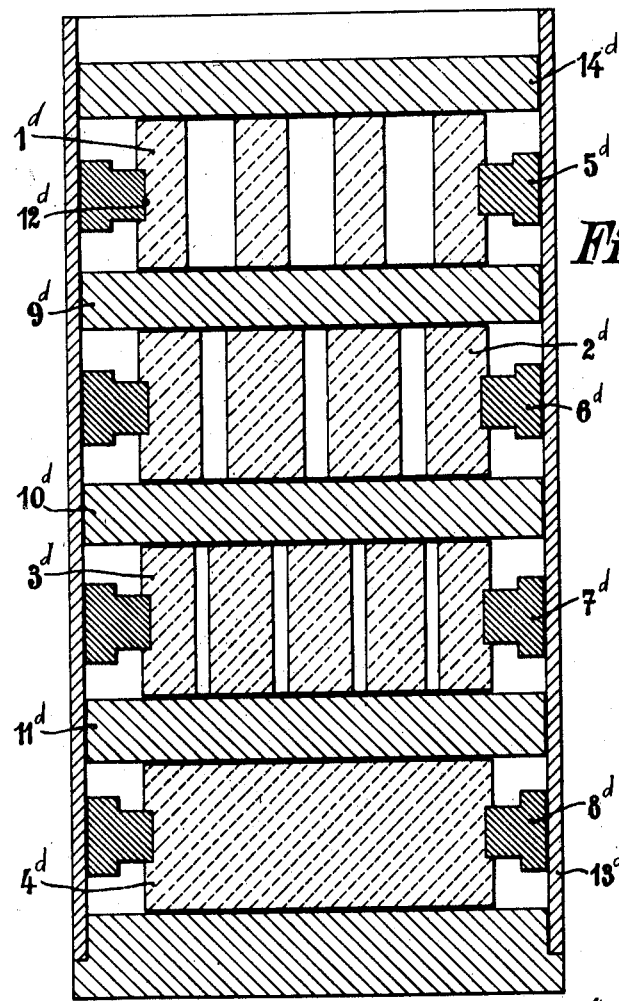
Figure 7 is a vertical central sectional view of a modified form of my improved shock absorber.
Figure 8:
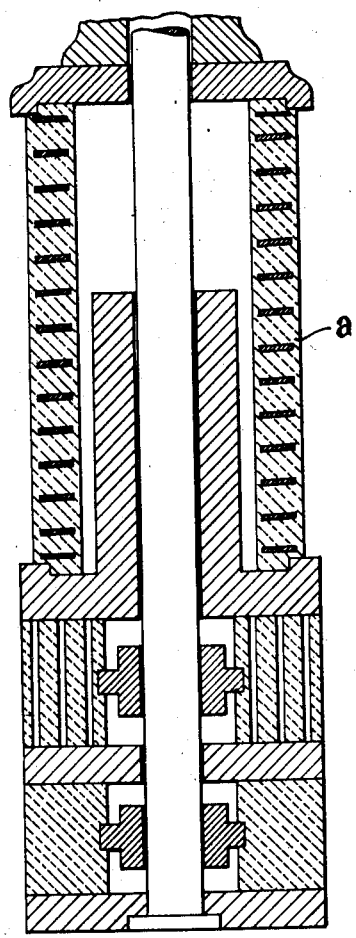
Figure 8 is a similar view of another modified form of the same.
Figure 9:
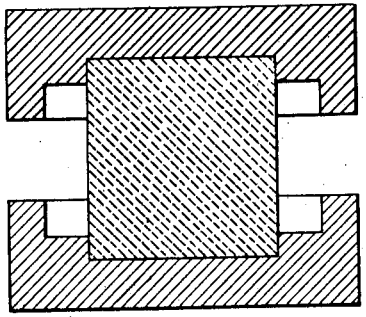
Figures 9 and 10 are detail sectional views showing modified forms of the shock absorber elements.
Figure 10:
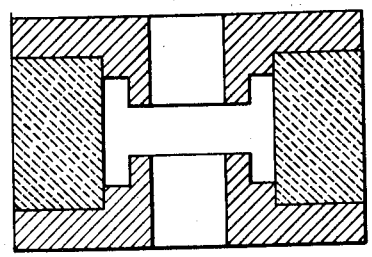

In Figure 7 the elements $1^d$, $2^d$ and $3^d$ are perforated, the element $4^d$ is solid. The elements of this deadener are guided outwardly by washers $5^d$, $6^d$, $7^d$ and $8^d$ serving simultaneously as abutments. These washers or like are fixed in the middle of each element and lodged in recesses $12^d$. They may be stuck on India rubber. $13^d$ is a tube enclosing the whole, $9^d$, $10^d$ and $11^d$ are discs intercalated serving as seats for the abutments and transmitting successively the exerted pressure on the first disc $14^d$. The elements in reinforced rubber are similar in construction to elements with cylindrical spiral springs fitted with rubber and in this case the spring does not operate as such but only as means to reinforce the rubber. Its thickness may be very slight, as at a, Figure 8, and it could consist of hardened or soft metal as may be preferred. The Figures 9 and 10 represent other constructional embodiments of such elements. In Figure 9 an element in plain India rubber is shown, provided with outer abutment; Figure 10 illustrates an element which is hollow, with inner compression abutment. In the deadener represented in Figure 7, all elements are not necessarily of the same diameter. They may progress in steps, with regard to the sizes of the diameters, which feature together with the different degrees of hardness of the India rubber and with the perforations, makes it possible to combine in different ways the load capacities of each India rubber cylinder.

In all cases, the guidance and the abutments of the elements may be provided in the interior if employing hollow elements and outwardly if using plain elements.

Figure 11:
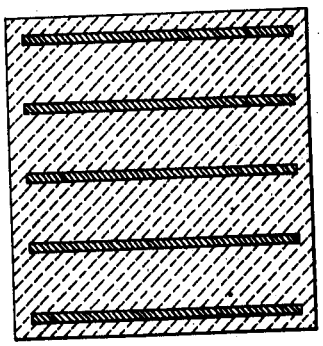
Figures 11, 12 and 13 are similar views showing further modification in the construction of the shock absorbing elements.
Figure 12:
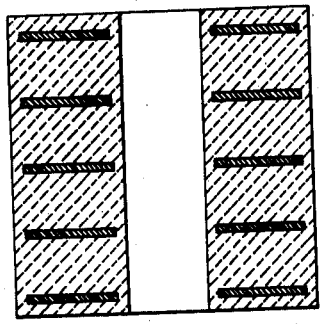
Figure 13:
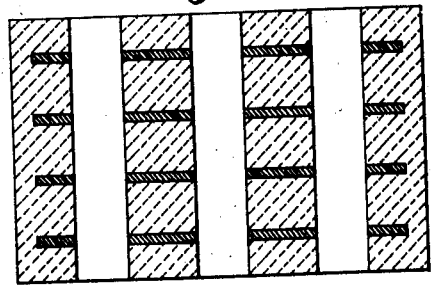

In Figures 11, 12 and 13 are represented elements armed with discs. If the element is plain as shown in Figure 11, plain discs may be employed. If the elements are hollow, the discs may have either one central aperture as shown in Figure 12, or several apertures as indicated in Figure 13.

The final result is in any case unchanged.

It has been heretofore stated that the action of an element does not commence until the foregoing element has done its whole compressing effort which it had to exercise. This is true exactly for the pneumatic elements, whereas with all other elements from the moment the pressure acts on the first element, all other elements being to work. They yield the less the larger is their load capacity.

Having now described the nature of my invention, what I claim, is:

1. A shock absorber comprising a base, a plurality of superposed yieldable elements arranged on the base, pistons movable with said elements and fluid containing members in which said pistons operate and are retarded, rods connecting said pistons to one of said elements and guiding devices in which said rods operate, said guiding devices comprising tubes connected to and movable with one of said elements and also comprising abutments on the base and on base members of said elements having openings in which said tubes and said rods are movable.

2. A shock absorber comprising a base, a plurality of superposed yieldable elements arranged on the base, pistons movable with said elements and fluid containing members in which said pistons operate and are retarded, rods connecting said pistons to one of said elements and guiding devices in which said rods operate, said guiding devices comprising tubes connected to and movable with one of said elements and also comprising abutments on the base and on base members of said elements having openings in which said tubes and said rods are movable, and means to limit the extent of movement of said guiding tubes and said piston rods.

In witness whereof I affix my signature.

HUBERT JULES WEYDERT.